2 Sheets--Sheet 1.
T. T. WOODRUFF.
Car Seat and Couch.
No. 4,241. Reissued Jan. 24, 1871.
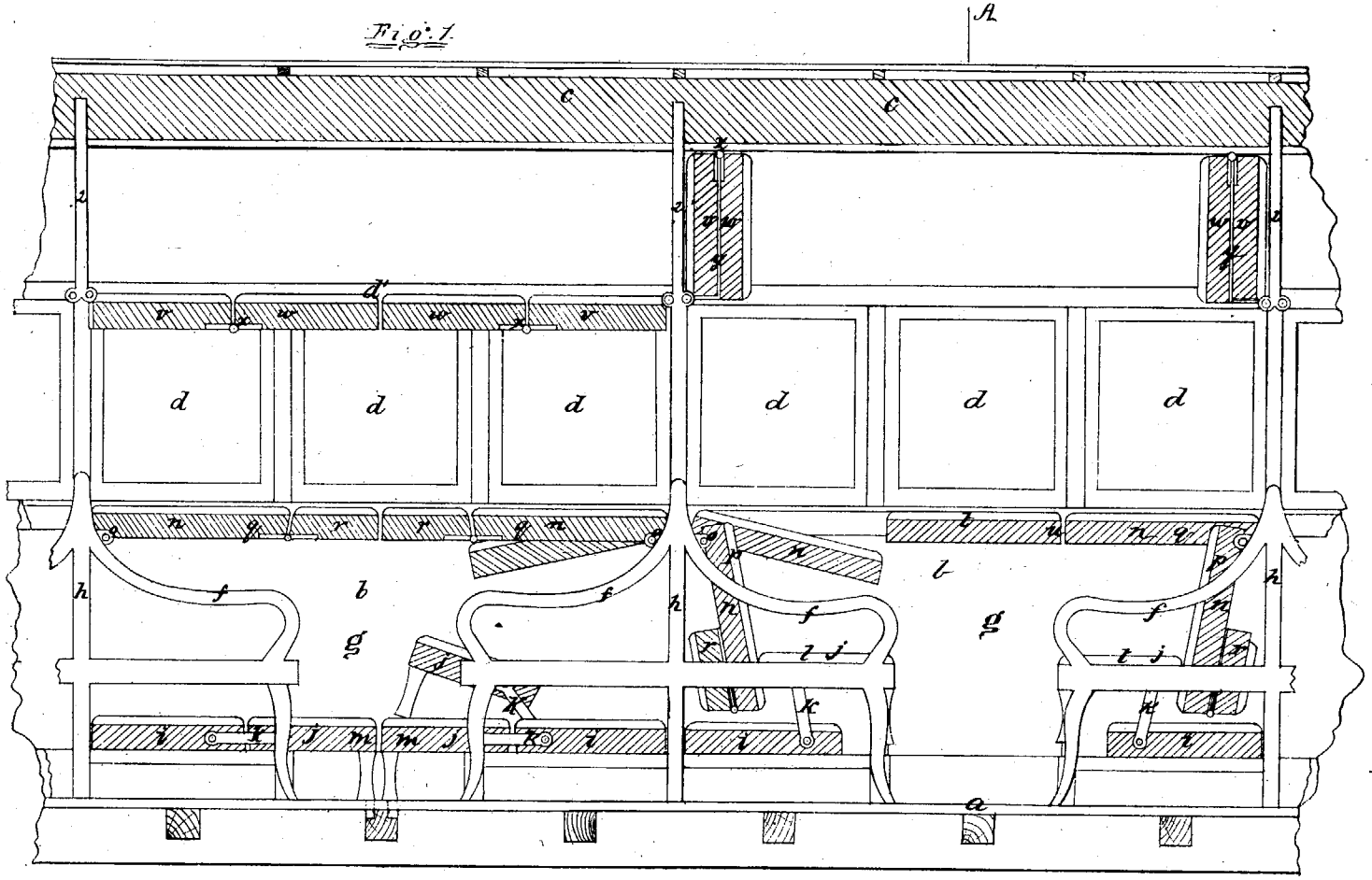
Witnesses { George E. Buckley
Wm. R. Wright
Inventor
Attorney pro tem T. T. Woodruff 2 Sheets--Sheet 2.

T. T. WOODRUFF.

Car Seat and Couch.

No. 4,241. Reissued Jan. 24, 1871.

Witnesses { George E. Buckley / John R. Wright

Inventor
Pottenger & Co
by T. T. Woodruff

UNITED STATES PATENT OFFICE.

THEODORE T. WOODRUFF, OF PHILADELPHIA, PENNSYLVANIA.

IMPROVEMENT IN RAILROAD-CAR SEATS AND COUCHES.

Specification forming part of Letters Patent No. 16,159, dated December 2, 1856; Reissue No. 1,439, dated March 17, 1863; extended seven years; Reissue No. 4,241, dated January 24, 1871.

*To all whom it may concern:*

Be it known that I, THEODORE T. WOODRUFF, formerly of Alton, Madison county, and State of Illinois, but now of Philadelphia, in the State of Pennsylvania, have invented certain new and useful Improvements in Convertible Seats and Couches for Railroad-Cars; and I do hereby declare that the following is a full, clear, and exact description thereof, reference being had to the accompanying drawings, making part of this specification, in which—

Figure 2:
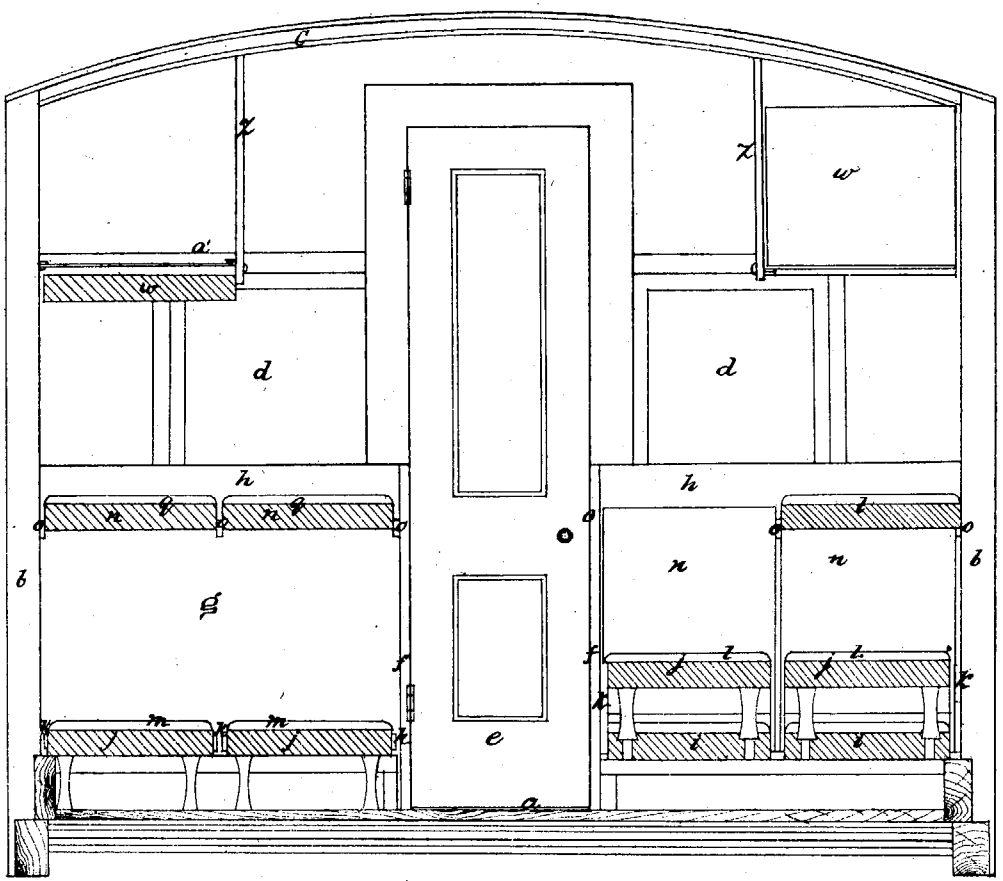

Figure 1 is a central longitudinal vertical section of a portion of a railroad-car representing the convertible seats in elevation; Fig. 2, a cross-vertical section of a car, taken at the line A *a* of Fig. 1, and representing the seats on one side of the car and the seats converted into couches on the other side; and Fig. 3, a section representing a modification.

The same letters indicate like parts in all the figures.

My said invention relates to improvements in convertible seats and couches for railroad-cars, by means of which couches can be provided for as many persons as can be seated when arranged as seats.

In the accompanying drawings, *a* represents the floor of the car, *b b* the sides, *c* the roof, and *d* the windows, all of which may be of the usual construction.

There is to be the usual longitudinal passage-way, *e*, between the sets or ranges of seats, bounded on each side by the end frames, *f*, of the seats, formed in the usual manner with arm-supports. The seats are arranged in pairs, so that each pair of seats, with its intermediate footway, shall together constitute the proper length for a couch—say six feet—and the spaces on each side between the sides of the car and the central passage-way are to be divided into compartments *g g* by cross-vertical partitions *h h*, extending up from the floor to about the usual height of the backs of seats. The said frames are arranged in pairs, and the cushions which rest against these partitions or frames for the travelers' backs to lean against are made movable, so that they can be removed at night. The distances between the back-frames are such that when the upright cushions are removed there will be just sufficient space to form a couch of proper length—say six feet. These frames, which thus support the back-cushions by day, also answer for partitions or head and foot boards between contiguous berths at night. Thus the important desideratum is accomplished of transverse seats with proper back-supports for passengers by day, convertible readily into partitioned couches of proper length by night. The partitions can be carried up so as to form, in combination with the lower transverse convertible berth, upper berths having partitions, which is also desirable.

Each pair or set of transverse seats *j j* is so arranged that the opposite pair of seat-cushions, with their respective frames, may be drawn toward each other and together fill up that which is the foot-space by day and form part of a couch by night. These seats, when drawn forward, rest at the inner side upon a ledge or support attached to the side of the car-body, and upon small feet or their equivalent on the side toward the aisle or passage-way.

The back-cushions *n n n n* of the seats are supported by the partitions or frames, and at the upper end of the back-cushions are hinge-joints *o*, by which they are connected with the partitions or supports *h*, so that they can be let down in a nearly vertical position, as represented at *p*, or turned up in a horizontal position, as represented at *q*. To the lower and under edge of these backs is hinged another cushioned frame, *r*, of the same width, but shorter, so that the frames *r* may be folded or turned up behind the backs when placed in the position represented at *p*, to form backs for the seats, or turned out in the same plane with the backs when placed in a horizontal position, as represented at *q*, to form an elevated couch in connection with the corresponding frames on the opposite side. The backs of the two seats, placed side by side, may have their backs arranged in this manner with an additional frame *r*, so as to form, in connection with the backs of the two opposite seats, two couches side by side. But instead of this, the backs of the two opposite seats next to the side of the car may be made without the additional frames *r*, and in that case there is to be an elevated cushion-frame, *t*, attached to and projecting from the side of the car, on a level with the backs when elevated, to fill up the space between the two corresponding backs when thrown up in a horizontal position, to form, in connection with them, one of the elevated couches, as represented at *u*. When the backs are elevated to a horizontal position to form upper couches they are to be secured by catches and bolts in any suitable manner.

When the seats are to be converted into couches the frames which form the seats when in the position *l* are to be drawn out to the position *m m* to form couches, and then the backs can be removed, and, if desired, converted into elevated couches, and when the couches are to be converted into seats the backs are first to be folded, and then the frames *j* carried back to the position *l* to form the seats. Another elevated couch is formed above the windows in each compartment in the sides of the car by the combination of two sets of frames, each set being composed of two cushioned frames, *v w*, hinged together, as at *x*, so that they can be folded up, as represented at *y*, to be out of the way, the frames *v* being in turn hinged by their opposite edges to partitions *z*, extending down from the roof, and extending out from the side of the car; or these partitions may be continuations of the partitions *h h*. There are two such sets of hinged frames for each compartment, and when they are to be formed into an elevated couch they are folded out in a horizontal position, as represented at *a'*, the two sets uniting in the middle and there secured in a suitable manner by catches or bolts. In this way, if desired, as many as five couches may be formed in each compartment, so that, if preferred, the four persons occupying the four seats of each compartment may be accommodated with couches without the necessity of using either the lowest couch nearest the side of the car or the couch formed by the backs of the two seats farthest from the side of the car; or, if desired, the three couches in each compartment nearest the side of the car may be used as such, leaving two seats next to the passage-way *e*.

Figure 3:
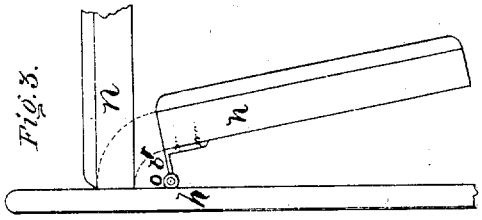

If it should be desired to make the backs *n* of the seats low, or to elevate the couches formed by the backs to a greater height, this may be effected by forming the hinged joint, as represented in Fig. 3, with a projecting stem, *b'*, on each side of the backs. In this way the couch will be elevated above the hinge-joint to the extent of the length of the stem.

I do not wish to be understood as limiting my claim of invention to the special arrangement and construction of the several parts, as these may be variously modified by the substitution of equivalent means.

What I claim as my invention, and desire to secure by Letters Patent, is—

1. In the ordinary long passenger railway-car, the combination of a series of seats arranged in pairs transversely on each side of the central passage-way, with diaphragms or partitions between each pair of transverse seats at such distance apart as to permit of berths between these diaphragms or partitions.

2. The arrangement of the back-frame of said transverse seats, so that the frame which supports the back-cushion by day may form also the partition between the lower couches by night.

3. The combination of the set of transverse seats, the supporting back-frames, and the removable back-cushions by which the proper length can be given to the couch at night and the proper support for the passenger's back by day.

4. The employment of removable cushions which rest against the transverse back-frames by day to form part of a sleeping-berth at night.

5. The combination of a pair of transverse seats and partitions on each side of the pair and the movable seat-cushions and intermediate supports between the seats, so that the opposite day seat-cushions on each pair may be brought together and occupy the intermediate space or footway between the seats as part of a couch.

6. The combination of the pairs of transverse seats, with partitions on each side of each pair so arranged as to form a double berth below, with the additional upper movable berths between the partitions so arranged as to convert the night-car into a complete day-car, furnishing an equal number with sleeping and sitting accommodations.

7. Forming an elevated couch above the couch formed by the backs of seats by a series of hinged frames, substantially as described.

T. T. WOODRUFF.

Witnesses:
WM. R. WRIGHT,
J. MCCOLGAN.